(12) United States Patent
Paillet et al.

(10) Patent No.: US 7,478,517 B2
(45) Date of Patent: Jan. 20, 2009

(54) WRAPPING DEVICE

(75) Inventors: Frédéric Paillet, Gray (FR); Didier Deiphigue, Dijon (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/779,323

(22) Filed: Jul. 18, 2007

(65) Prior Publication Data
US 2008/0098692 A1 May 1, 2008

(30) Foreign Application Priority Data
Oct. 31, 2006 (DE) .................. 10 2006 051 273

(51) Int. Cl.
*B65B 11/56* (2006.01)
(52) U.S. Cl. .................. 53/587; 53/211; 53/389.3; 53/389.4
(58) Field of Classification Search .............. 53/587, 53/118, 389.3, 389.4, 211, 215, 430, 465
See application file for complete search history.

(56) References Cited

U.S. PATENT DOCUMENTS 4,703,605 A 11/1987 Ackermann
6,796,109 B2 9/2004 Viaud
7,278,251 B2 * 10/2007 Paillet et al. .................. 53/587
7,334,382 B2 * 2/2008 Smith ........................ 53/389.2
7,356,981 B2 * 4/2008 McClure et al. ............... 53/587

FOREIGN PATENT DOCUMENTS

| EP | 1 321 028 | 6/2003 |
|---|---|---|
| WO | WO 2004/060768 | 7/2004 |
| WO | WO 2006/043127 | 4/2006 |

OTHER PUBLICATIONS

European Search Report, Feb. 6, 2008, 6 Pages.

\* cited by examiner

*Primary Examiner*—Louis K Huynh

(57) ABSTRACT

A wrapping device is mounted at an exterior of a bale forming chamber of a large round baler and includes two wrapping material supply rolls comprised, if desired, of two types of wrapping material, which may optionally be brought together and introduced through an inlet of the bale forming chamber. In this way, it is possible, for example, to supply film with a netting in order both to bind and protect the bale.

6 Claims, 3 Drawing Sheets

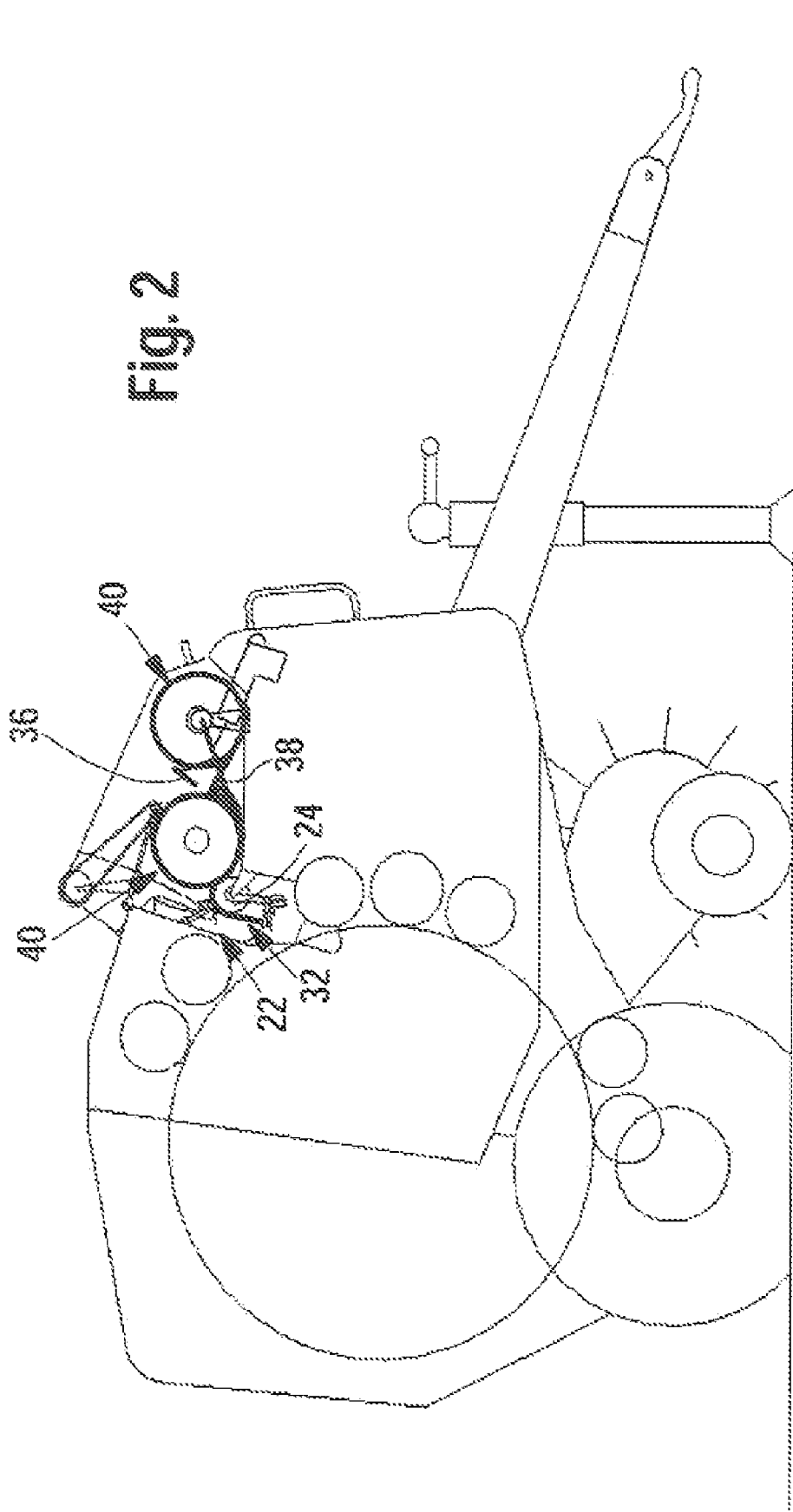

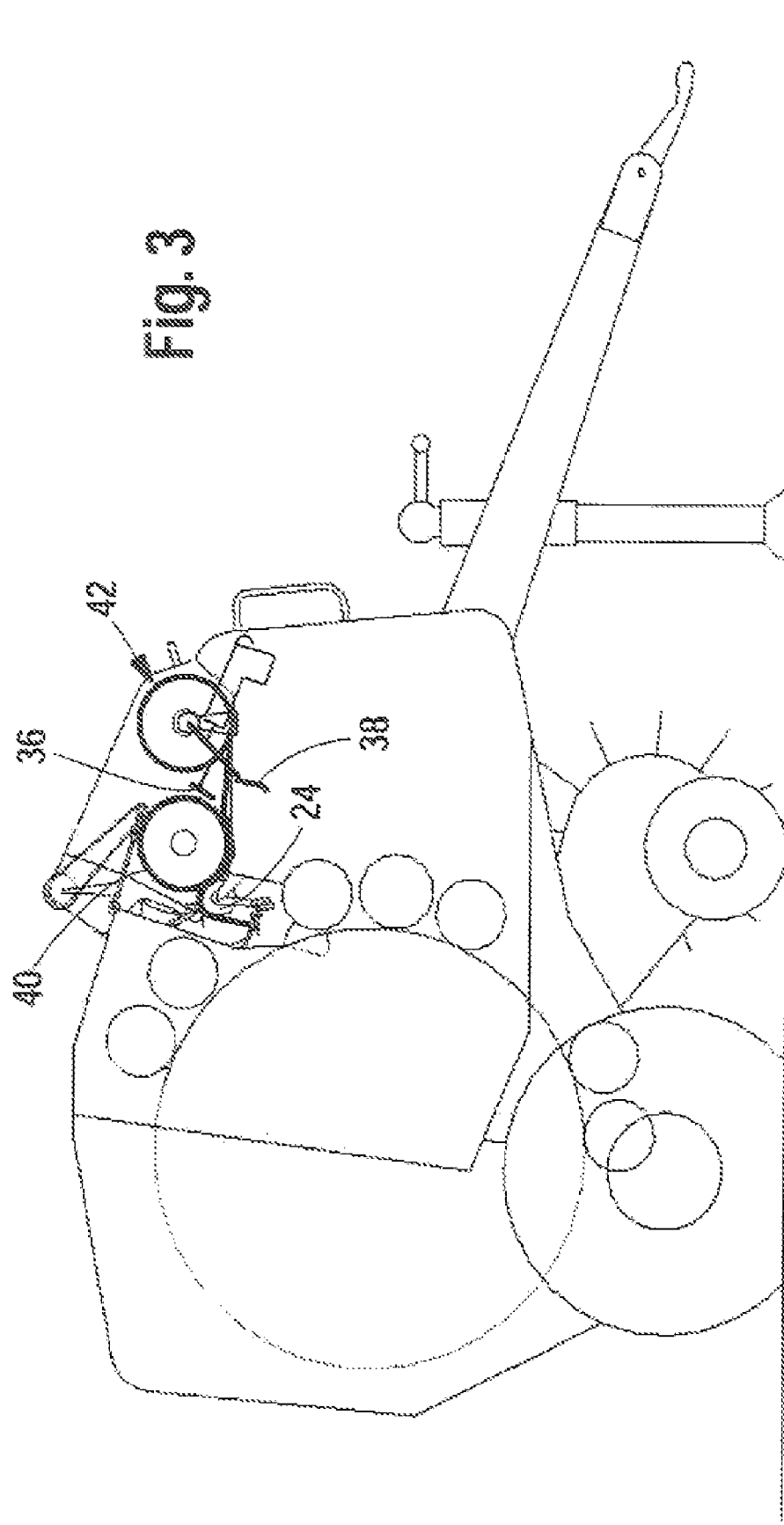

WRAPPING DEVICE

FIELD OF THE INVENTION

The invention relates to a wrapping device in a round bale press, having a first wrapping material supply roll and at least a second wrapping material supply roll comprised of desired types of wrapping material which are together fed into a bale forming chamber during at least part of a wrapping cycle.

BACKGROUND OF THE INVENTION

U.S. Pat. No. 4,703,605 discloses feeding film and netting into a bale forming chamber at the same time, for which purpose a respective supply device is provided. In the case of a device according to EP 1 321 028, similarly, a round bale is wrapped with both netting and film, the question of how the alternate layers are applied being left open.

According to WO 2004/060768 A1, a single web of a wrapping material is supplied with the netting and film sections connected to one another.

U.S. Pat. No. 6,796,109 B2 teaches using, in a round bale press, a roll with film or netting for the winding procedure and storing a roll next to it, as the supply.

The problem underlying the invention is that more than one wrapping material cannot be simultaneously supplied, at low cost and as desired, for wrapping a completed bale in a bale forming chamber.

SUMMARY OF THE INVENTION

According to the present invention, there is provided a wrapping device for simultaneously wrapped a bale with wrapping material supplied for multiple supply rolls, with the device overcoming the cost drawback associated with the prior art.

An object of the invention is to provide a wrapping device including a wrapping material feed arrangement utilizing the same feed roll for introducing wrapping material supplied from at least two different supply rolls into an inlet provided to the bale forming chamber.

In this way, wrapping material supply rolls comprised of various types of wrapping material are kept ready so that they can optionally be used, and for the purpose of the wrapping materials comprising the rolls being supplied together the supply rolls are connected to one another and so that the wrapping material of one supply roll which is being conveyed in any case carries along the additional wrapping material of the other supply roll. The two wrapping materials may equally well be connected without or with additional means, such as adhesives, staples, perforations and the like, depending on the nature of their surfaces. The important point here is that the wrapping material from both of the wrapping material supply rolls do not always have to be guided into the bale forming chamber, and no additional supply ducts or guides or the like are required. Preferably, both supply rolls are stored next to one another, although this does not rule out the possibility that they are located in quite different places and are brought together only once they come into the vicinity of the entry point into the bale forming chamber.

The use of the same wrapping material feed device, for example feed rolls, grippers, etc., has the advantage that technical complexity is kept low.

It is possible to respond to the respective conditions of use in optimum manner if a supply of the appropriate combinations of wrapping materials, for example film, netting twine, is kept, where it is useful. It is also possible to provide different versions of the same type of wrapping materials, for example film, which achieve a particular effect when the films are combined. Either film or netting may be used as the first or the second wrapping material, since both have surface properties making it possible for them to carry along another wrapping material. In particular conditions, it may even be appropriate to provide three rolls, preferably respectively comprising different types of wrapping materials which may optionally be connected to one another.

The different wrapping materials may be connected in different ways for the purpose of transport, for example mechanically, pneumatically, or the like. In a technically simple arrangement an abutment device is used which presses a length of the wrapping material lying upstream against the wrapping material lying downstream and hence connects them to one another, with or without aids. The simplest way to do this is for an abutment device of this kind to be brought into a position of abutment by a pivotal movement.

Although it is conceivable for the abutment device to be activated manually and mechanically at the bale press, a remote-controlled actuation device that is operated as needed, for example, from a farming tractor, is preferred.

Constructing the abutment device as a movable metal plate, a roll or a rod is possible at low cost and is technically reliable, with it being possible to use, in each case, levers, servomotors and the like to bring about the movement.

The second wrapping material may be used in a very flexible manner if it is possible not only for the abutment means to bring the second wrapping material into abutment against the first wrapping material, whereby the second wrapping material is introduced into the bale forming chamber with the first wrapping material. However, the second wrapping material may be selectively divided from the first wrapping material again. A division of this kind may be performed with a blade and indeed with a retaining device.

BRIEF DESCRIPTION OF THE DRAWINGS

The drawing illustrates an exemplary embodiment of the invention, described in more detail below. In the drawing:

FIG. 2 shows the round bale press from FIG. 1 in a condition in which a length of the wrapping material from a second supply roll is brought into abutment against a wrapping material comprising the first supply roll for the purpose of being supplied to a bale forming chamber, and FIG. 3 shows the round bale press from FIG. 1 once the two wrapping materials have been divided following their being joined, as shown in FIG. 2.

DESCRIPTION OF THE PREFERRED EMBODIMENT

Figure 1:
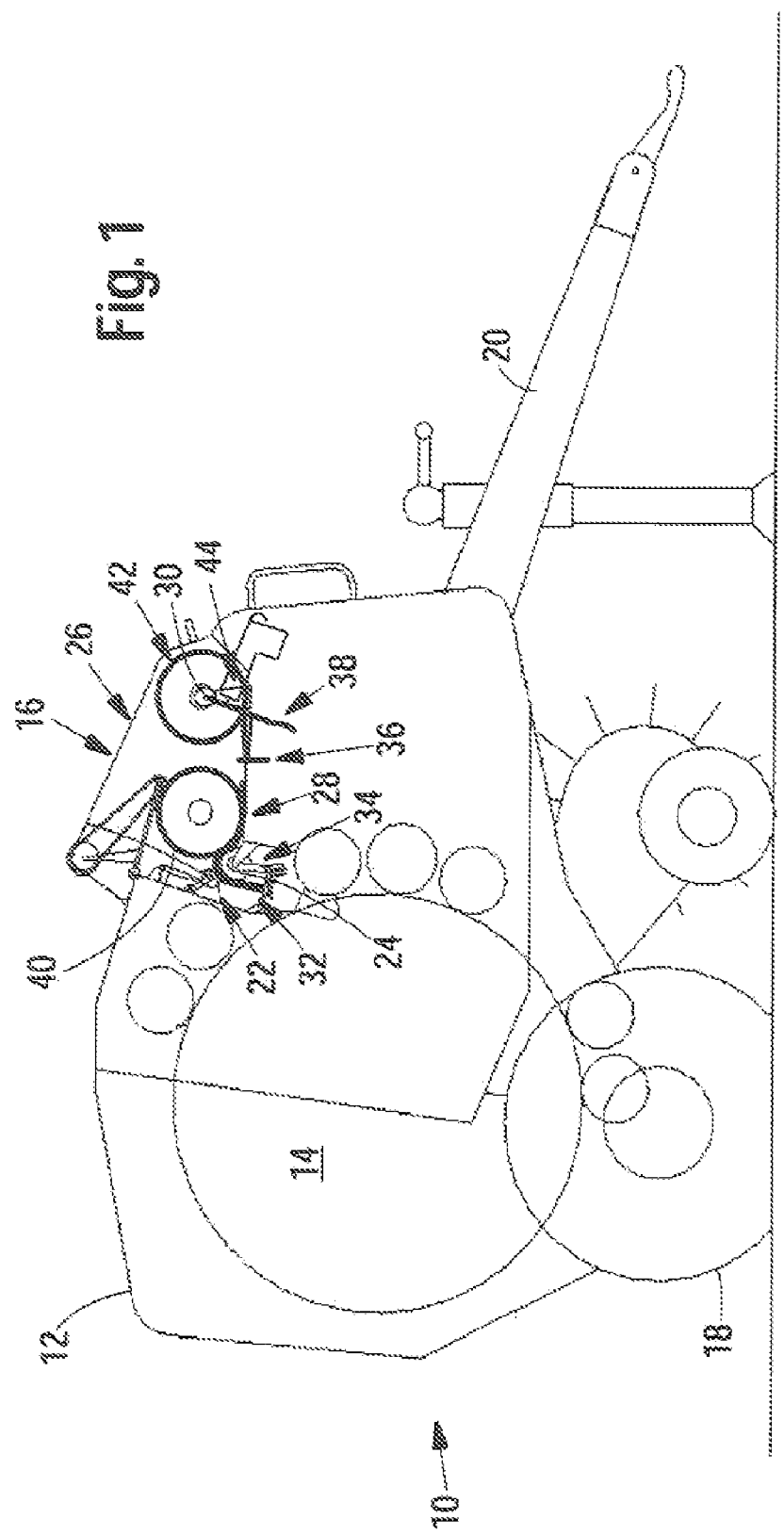
FIG. 1 shows a round bale press in side view, with a wrapping device in a standby condition.

FIG. 1 shows a round bale press 10 having a frame 12, a bale forming chamber 14 and a wrapping device 16.

The round bale press 10 takes the form of a press with a chamber that is fixed in size, but may be of any known construction, and serves to press agricultural or industrial goods.

The frame 12 is supported on the ground by wheels 18 and is attached to a tractor vehicle by means of a drawbar 20. The frame 12 bears the walls of the bale forming chamber 14, a pick-up and any further components required for the round bale press 10.

The bale forming chamber 14 is a known type and has in an upper front region an inlet 22 for wrapping material, which will be described in more detail below. The inlet 22 could also be located at a different point.

The wrapping device 16 is substantially constructed as described for example in U.S. Pat. No. 6,796,109. In this exemplary embodiment, a compartment 26, a first carrier 28, a second carrier 30, a feed device 32, a first dividing device 34, a second dividing device 36 and an abutment arrangement 38 are provided.

The compartment 26 is formed by a housing or the like and is located adjacent to the inlet 22 in an accessible, upper front region of the round bale press 10. The compartment 26 is intended to receive a first wrapping material supply roll 40 comprised of a first wrapping material, and a second wrapping material supply roll 42 comprised of a second wrapping material.

The first carrier 28 is located at the inlet 22 and is formed by a base surface, a tray or the like, but could also contain a shaft or the like which if appropriate has the facility to be braked. The first wrapping material supply roll 40 is held rotatably on the carrier 28.

The second carrier 30 is formed by a shaft which runs transversely in relation to the direction of travel and on which the second wrapping material supply roll 42 is mounted. The second carrier 30 could be constructed in the same way as the first carrier 28, that is to say as a load-bearing base surface, provided the supply roll is secured to prevent it from rolling away. The second carrier 30 is constructed such that the second wrapping material supply roll 42 mounted on the carrier 30 is braked to prevent it from rotating freely, and is easy to replace. Instead of one, two supply rolls could also be used.

The feed device 32 includes a feed roll 24, which may be driven to initiate the wrapping procedure and has an overrunning clutch which acts as soon as the first and second wrapping materials are respectively drawn from the first and second supply rolls 40 and 42 into the bale forming chamber 14 by a formed bale rotating in the chamber. At least a length of the first wrapping material is carried along from the first supply roll 40 by the feed roll 24 as a result of the wrapping material supply roll 40 being pressed against the feed roll 24 by the wrapping material. The feed roll 24 is located between the wrapping material supply roll 40, on the other hand, and the inlet 22 on the other.

The first dividing device 34 comprises a blade, a toothed edge or the like, which may be brought into abutment against an anvil or a counter-blade in a conventional manner when it is actuated. The dividing device 34 also includes a braking device (not shown) which stops the feed roll 24 as soon as the dividing procedure is carried out so that the roll 24 is prevented from continuing to rotate. The first dividing device 34 is actuated once the wrapping procedure is terminated, and divides the first wrapping material that is being pulled from the first supply roll 40, the first dividing device acting to divide the second wrapping material in cases where the latter is being supplied by the supply roll 42 as well.

The second dividing device 36 is only provided, as an option, when it is to be possible to prevent the second wrapping material from the first wrapping material from being supplied. This prevents a person operating the unit from having to divide the second wrapping material from the first wrapping material manually. The second dividing device 36, including a braking device (not shown), operates in the same way as the first dividing device 34 but is not actuated when the bale is to be bound but only when supply of the second wrapping material coming from the second supply roll 42 is to be terminated. A blade (not designated in more detail) or the like of the second dividing device 36 is preferably pivotal about the center axis of the second supply roll 42 by means of a remotely controlled motor.

The abutment device 38, like the second dividing device 36, is pivotal about the center axis of the second supply roll 42, although other solutions to this are also possible. The abutment device 38 is adjusted by means of an actuating device 44 which in this case is constructed as an electric motor and may be controlled from the tractor vehicle. As an alternative, a linkage, cable, hydraulic motor or the like could also be used. The abutment device is constructed, in this case, with an abutment plate, such that it presses a length of the second wrapping material against the outer surface of the first supply roll 40, with the result that the first wrapping material supply roll 40 carries the length of the second wrapping material along with it. The abutment device 38 moves in the space between the first and second wrapping material supply rolls 40 and 42, respectively.

It is here noted that the feed device 32 together with the first and second carriers 28 and 30, respectively, and the abutment device 38 define a feeding arrangement.

The first wrapping material supply roll 40 comprising the first wrapping material is located adjacent the inlet 22, and in most cases the first wrapping material is in the form of a netting. By contrast, the second wrapping material supply roll 42 comprising the second wrapping material is remote from the inlet 22 and in most cases is in the form of a film. In this way, the bale may for example be bound rapidly by a netting and additionally protected from water by a film. However, it would also be possible for both wrapping supply rolls 40 and 42 to be comprised of film, which has the advantage that an air-tight wrapping is achieved more quickly in the case of silage. However, it is also conceivable to use twine as the material comprising the first supply roll 40, and a film as the wrapping material comprising the second supply roll 42, in which case the twine binds the bale and the film ensures protection or air-tightness. If both wrapping materials comprising the supply rolls 40 and 42 are in the form of a twine, it is possible to attach the leading end of the twine comprising the second supply roll 42 to the trailing end of the twine of the first supply roll 40, with the result that the round bale press 10 can remain in operation longer.

Having described the preferred embodiment, it will become apparent that various modifications can be made without departing from the scope of the invention as defined in the accompanying claims.

The invention claimed is:

1. In a wrapping device mounted to a round bale press adjacent a baling chamber and including a first wrapping material supply roll, a second wrapping material supply roll, a feed arrangement for feeding wrapping material from each of said first and second wrapping material supply rolls into said baling chamber during at least a part of a wrapping cycle, the improvement comprising: said baling chamber including a single inlet for receiving first and second lengths of wrapping material respectively from said first and second supply rolls; and said feed arrangement including at least one feed roll located for feeding wrapping material into said single inlet, an abutment device mounted for being selectively moved for pressing a length of material extending from said second wrapping material supply roll against a surface of said first wrapping material supply roll so as to cause said length of material extending from said second wrapping material supply roll to be moved against said at least one feed roll together with a length of material extending from said first wrapping material supply roll, and support structure for guiding said wrapping material from each of said first and second wrapping material supply rolls to said feed roll.

2. The wrapping device, as defined in claim 1, wherein said first wrapping material supply roll is comprised of wrapping material formed as one of film, netting or twine, and said second material supply roll is comprised of wrapping material formed as one of film, netting or twine.

3. The wrapping device, as defined in claim 2, wherein, when each of said first and second supply rolls is comprised of twine, a trailing end of the twine of said first supply roll may be tied to a leading end of the twine of the second supply roll.

4. The wrapping device, as defined in claim 1 wherein said feed arrangement includes a remote-controlled actuation device coupled to said abutment device for selectively moving the abutment device for effecting engagement of said length of material extending from said second supply roll against said first supply roll.

5. The wrapping device, as defined in claim 4, wherein said abutment device is constructed so as to include one of a metal plate, a roll or a rod.

6. The wrapping device, as defined in claim 1, wherein a dividing device is located between said first and second supply rolls for selectively severing the length of wrapping material extending between said first and second supply rolls.

* * * * *